United States Patent
Bang et al.

(10) Patent No.: US 10,956,478 B2
(45) Date of Patent: Mar. 23, 2021

(54) CONTROVERSY DETECTION, IMPACT ASSESSMENT AND IMPACT PREDICTION BASED ON SOCIAL MEDIA DATA

(71) Applicant: S&P Global Inc., New York, NY (US)

(72) Inventors: Grace Bang, New York, NY (US);
Xiaomo Lu, Forest Hills, NY (US);
Zhiqiang Ma, Jersey City, NJ (US);
Azadeh Nematzadeh, Brooklyn, NY (US)

(73) Assignee: S&P Global Inc., New York, NY (US)

(*) Notice: Subject to any disclaimer, the term of this patent is extended or adjusted under 35 U.S.C. 154(b) by 108 days.

(21) Appl. No.: 16/230,980

(22) Filed: Dec. 21, 2018

(65) Prior Publication Data
US 2020/0201896 A1     Jun. 25, 2020

(51) Int. Cl.
*G06F 16/35* (2019.01)
*G06F 16/9536* (2019.01)
*G06Q 10/06* (2012.01)
*G06Q 50/00* (2012.01)

(52) U.S. Cl.
CPC .......... *G06F 16/35* (2019.01); *G06F 16/9536* (2019.01); *G06Q 10/0639* (2013.01); *G06Q 50/01* (2013.01)

(58) Field of Classification Search
CPC ...................................................... G06F 16/16
See application file for complete search history.

(56) References Cited

U.S. PATENT DOCUMENTS 9,105,008 B2     8/2015     Popescu et al.

OTHER PUBLICATIONS

Atefeh et al., "A survey of techniques for event detection in twitter," Computational Intelligence 31(1):132-164, Feb. 31, 2015.
Bollen et al., "Twitter mood predicts the stock market," Journal of computational science 2(1): 1-8, Mar. 1, 2011.
Choi et al., "Identifying controversial issues and their sub-topics in news articles," Pacific-Asia Workshop on Intelligence and Security Informatics, pp. 140-153, Jun. 21, 2010.
Dori-Hacohen et al., "Automated controversy detection on the web," European Conference on Information Retrieval, pp. 423-434, Mar. 29, 2015.
Liu et al., "Reuters tracer: Toward automated news production using large scale social media data," Big Data, International Conference on IEEE, pp. 1483-1493, Dec. 11, 2017.
Pennacchiotti et al., "A Machine Learning Approach to Twitter User Classification," Icwsm 11(1):281-288, Jul. 17, 2011.
Pfohl et al.,m "Stance Detection for the Fake News Challenge with Attention and Conditional Encoding," 14 pages, 2017.
Popescu et al., "Detecting controversial events from twitter," Proceedings of the 19th ACM international conference on Information and knowledge management, ACM, pp. 1873-1876, Oct. 26, 2010.

(Continued)

*Primary Examiner* — Hau H Hoang
(74) *Attorney, Agent, or Firm* — Fish & Richardson P.C.

(57) ABSTRACT

Predicting the impact of controversial events on an entity, such as a company, can indicate the entity's ability to operate successfully in the future and optimize long-term value. This specification describes systems and methods to detect controversial events, identify the context of an event, measure the scope of the event, measure its current impact on the entity's performance, and predict the event's future impact on the entity's performance.

21 Claims, 6 Drawing Sheets

(56) References Cited

OTHER PUBLICATIONS

Popescu et al., "Extracting events and event descriptions from twitter," Proceedings of the 20th international conference companion on World wide web, ACM, pp. 105-106, Mar. 28, 2011.
Recasens et al., "Linguistic models for analyzing and detecting biased language," Proceedings of the 51st Annual Meeting of the Association for Computational Linguistics 1(1):1650-1659, 2013.
Šćepanović et al., "Semantic homophily in online communication: evidence from twitter," Online Social Networks and Media, 2:1-18, Aug. 31, 2017.
Tonon et al., "ArmaTweet: detecting events by semantic tweet analysis," European Semantic Web Conference, pp. 138-153, May 28, 2017.
Van Der Maaten, "Barnes-hut-sne," arXiv preprint arXiv: 1301.3342, Jan. 15, 2013.

CONTROVERSY DETECTION, IMPACT ASSESSMENT AND IMPACT PREDICTION BASED ON SOCIAL MEDIA DATA

BACKGROUND

Technical Field

This specification relates to detecting a controversy associated with an entity, such as a company, and assessing and predicting the impact of the controversy on the entity.

Background

Social networking applications allow users to share real-time information and opinions by giving users a platform to share their voice and learn about others' opinions. These platforms facilitate the spread of information through social contact and can enhance the visibility of information. Thus, a local event can gain global attention. Often, the context of an event can indicate the impact the event will have on an entity. Many social networking applications, such as microblogs, are free and easy to use so users post regularly from many locations and on many topics. A user of such an application can use the application to express how she feels about a company in general or about certain topics related to the company. For example, a user can use such an application to express how she feels about a company's product or about a controversial action taken by a company.

SUMMARY

This specification describes technologies for real-time detection of a controversial event involving a given entity. For instance the entity can be a company, and a controversial event can be newsworthy public attention about the company's environmental policy. A controversy detection system utilizes at least in part social media data (such as micro-blog data) to detect a controversial event. Additionally, this specification includes description of systems and methods for assessing the current impact of the controversial event on the entity, and predicting an event's future impact on an entity.

In general, one innovative aspect of the subject matter described in this specification can be embodied in methods that include the actions of: receiving social media data and performance data; detecting, based at least in part on the social media data, a controversy impacting an entity; identifying a scope and a topic of the controversy; assessing an impact of the controversy on performance of the entity based at least in part on the performance data; predicting a future impact of the controversy on the entity's performance based at least in part on the scope and the topic of the controversy; and forwarding, for display to a user, an indication of the future impact to a user's computing device. Scope can also be predicted. The future impact of the controversy can be based on topic and various attributes of the event such as one or more of the 5Ws, i.e. the what, where, when why and who of the controversial event.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. Detecting a controversy impacting an entity can include detecting a controversial event impacting an entity based on social media data and within a specified time, e.g., within two hours, of the occurrence of the controversial event. Detection of the controversy impacting an entity can occur within a range of times depending on the implementation. The scope of the controversy can be categorized as at least one of a local impact controversy, a national impact controversy, and a global impact controversy. The topic of the controversy can be classified as at least one of an operational controversy, an environmental controversy, a social controversy, a governance controversy, or a legal controversy. The social media data can be microblog data and detecting a controversy can include determining and leveraging features of a microblog entry, the features including at least one of a hashtag, proper nouns, 5W1H terms, a sentiment, and a news link contained in the microblog entry. The social media data can be microblog data and detecting a controversy can include detecting a controversial event based at least in part on the microblog data including determining at least one entity mentioned in a microblog entry, and at least one of where, when, how and why the controversial event occurred.

Detecting a controversy can include determining the volume of microblog entries referencing a controversial event per predetermined time period and detecting a sentiment of at least some of the microblog entries. Determining the volume of microblog entries referencing a controversial event per predetermined time period can include determining the volume of microblog entries referencing a controversial event per hour.

Detecting a controversy can include: determining a cluster of microblog entries and wherein the microblog is a member of the cluster if it shares characteristics with the cluster; determining the number of news links in each cluster; and determining the source of at least one microblog entry in the cluster, when available. The controversy can include a controversial event and assessing the impact of the controversy can include determining a broadcast score for a controversial event based at least in part on the type of news media that are mentioned in microblog entries that refer to the controversial event. In other words, the system collects the news links that appear in social media data for a controversy and the system demines a broadcast score based on the news links. A broadcast score indicates the type of news media that covers the event. The system uses broadcast score to assess the impact of a controversy. Assessing the impact of the controversy can include assessing the impact of the controversy based at least in part on a knowledge base of controversial events and their impacts.

The controversy can include a controversial event and predicting the future impact of the controversy on the entity's performance can include: determining characteristics for a controversial event including event information and controversy information; and utilizing a machine learning model to predict, based at least in part on the characteristics and on prior impact assessments for controversial events having similar features, the future impact of the controversial event on the entity's performance. The controversy can include a controversial event and predicting a future impact of the controversy on the entity's performance based at least in part on the topic of the controversy can include predicting a future impact of the controversy on the entity's performance based on at least one of who, what, when, where and how of the controversial event.

Another innovative aspect of the subject matter described in this specification can be embodied in a system including one or more computers and one or more storage devices on which are stored instructions that are operable, when executed by the one or more computers, to cause the one or more computers to perform operations including: receiving social media data and performance data; detecting, based at least in part on the social media data, a controversy impacting an entity; identifying a topic of the controversy; assessing an impact of the controversy on performance of the entity based at least in part on the performance data; predicting a future impact of the controversy on the entity's performance; and forwarding, for display to a user, an indication of the future impact to a user's computing device.

Yet another innovative aspect of the subject matter described in this specification can be embodied in method including the actions of: receiving social media data; detecting, based at least in part on the social media data, a controversy impacting an entity; identifying a scope and a topic of the controversy; predicting a future impact of the controversy on the entity's performance based at least in part on the scope and topic of the controversy; and forwarding, for display to a user, an indication of the future impact to a user's computing device.

The subject matter described in this specification can be implemented in particular embodiments so as to realize one or more of the following advantages. By providing the entity with early detection of a controversial event, the entity can mitigate the impacts of the controversy and/or prevent the controversy from growing or leading to a bad outcome. In an embodiment, the entity can detect the scope of a new controversial event and thus understand the amount of resources and/or attention to provide in addressing the event.

Partners, customers, and suppliers of the entity experiencing a controversial event can use an embodiment of the system described in this specification to gain a better sense of the impact on the entity in question. This knowledge is also valuable to investors or analysts. The early detection of a controversial event allows for analysts to react in real-time in incorporating that event into their analysis, for example, taking appropriate action to protect investments.

The output of the topic classification module is relevant to and can be utilized by financial analyst since the topic categories are identified as ones that stakeholders are most concerned about. For example, the system will filter out management topics that talk about the resignation of a senior manager because even if discussions around that topic may be controversial, the event will largely not impact the underlying operations of the entity. In contrast, an environmental, legal and/or governance controversy could have a high impact on the entity's performance.

The controversy impact assessment capability of systems and methods described this specification help stakeholders assess the overall changes to a given entity as a result of the controversial event. The impact assessment system described in this specification provides a quantitative assessment of the impact of a controversial event, e.g., an event of type X, on an entity of type Y results in Z % decrease/increase in the performance of the entity.

The controversy impact prediction module produces early estimation of the resulting impact when a controversial event is still developing. This prediction is based on the knowledge learned from impact assessment of past controversial events. It can help stakeholders decide how to mitigate the negative impact and shareholders react to protect their investments in a timely manner.

For long-term analysis, this information could serve as early indications of a more long-term or permanent impact to the performance of the entity. For example, if performance deteriorates in a meaningful manner that could result in the entity having difficulties in accessing capital, which could stunt the entity's future performance. More broadly, long-term stakeholders may feel uncomfortable with the operations of the entity, as revealed by the event, and choose to no longer be a supporter of, or associated with, the entity. The scope of the event also provides insight to the potential cost of the event for the entity which in turn can impact the entity's longer-term market performance.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

1. Introduction

Figure 1:
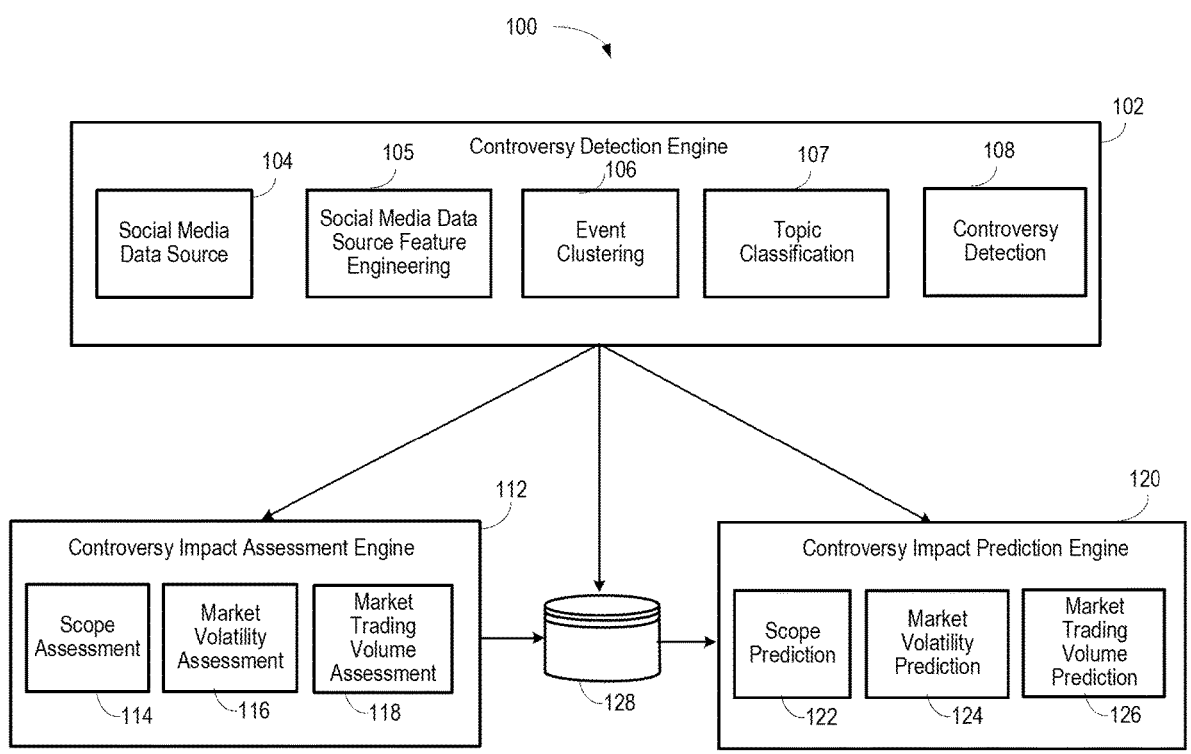
FIG. 1 is an example of a controversy detection and impact assessment and prediction system.

Social media applications such as microblog platforms offer users a platform to share and disseminate almost any content including opinions, news, and real-time information about events such as sports events, concerts, or controversial events.

In an embodiment, a controversial event for an entity, such as a company is a credible and newsworthy incident, or set of incidents, that has the potential to impact an entity, for example, an incident caused by an employee or representative of the entity that has the potential to impact the entity's performance such as its operational performance. Such an incident can demonstrate a lapse in oversight or a potential gap in a risk management framework and policy execution by the entity.

Controversial events often trigger a large cascade of discussion on social media platforms and can involve a variety of topics including social, legal, governance, operational, and/or environmental topics. A controversial event can be related to a specific entity, e.g., the controversial event can be related to a product produced by the entity. In some cases, the large number of responses on a social media platform such as Twitter informs the public about the importance of an event, widens the scope of the controversial event, and brings public attention to an issue, which could result in meaningful damage to the performance of the entity. In certain cases, the responsible entity can be forced to take an action, e.g., to recall its product, which can impose a large burden on the entity and thus impact its overall performance.

Ignoring a controversial event in the early stages of the event can result in serious consequences for the entity. For example, it can lead the entity to bankruptcy.

Detecting the controversial event associated with the entity and measuring its impact scope and impact on performance early can help the entity address the event and mitigate the negative consequences of the event. The prediction of a change in performance (e.g., market performance) of the entity due to the controversial event can help an analyst properly assess portfolios, e.g., investment portfolios, and enable a robust quantitative incorporation of the expected impact of the event on the given entity. An analyst or the entity can leverage social media data to estimate the scope of a controversial event on the entity and its impact on market performance.

To this end, one embodiment of a controversial event detection system described in this specification utilizes real-time social media data, e.g., Twitter data, and equity and bond data. In one embodiment, the controversial event detection system includes a controversy detection engine, an impact assessment engine, and a prediction engine. The controversial event detection system collects and stores social media/microblog data, e.g., Twitter data, on a given entity. The system parses the incoming data, e.g., postings, and extracts the attributes about each posting. The system computes the sentiment of each posting. The system computes the part of speech of each term in the posting. The system verifies the credibility of a url as it appears in the posting if the url is associated with a source, e.g., news source or a social network user with a large following. A verified url, for example, is a url that comes from a credible news source. The system utilizes the posting's attributes and detects events specific to a given entity that indicate controversy. The system categorizes these controversial events into topics. The system can display the relationship between a burst of controversial events and the relevant performance data of an entity such as its stock or bond price.

Early signals of controversial events on the entity performance data may be useful to an analysis of the entity and its overall performance. In one embodiment, the system can be utilized as a data-driven alert tool that helps analysts detect, track, and assess controversial events in an efficient and timely manner.

The characteristics of corporate controversial events (e.g. controversy topics, the entity's reactions and negative sentiments) and their resulting impacts can be useful knowledge to understand the relationship between a controversy and its impact. These characteristics and their resulting impacts can be used to predict the impact of future controversial events based on the characteristics of the future controversial events.

2. Controversial Event
2.1. Basic Elements of Controversial Events
2.1.1. Event Elements 5W1H (sometimes referred to as Five Ws and How) is a term that can be used to refer to questions whose answers are considered basic in information gathering. They are often used by news professionals to describe the complete story on an event. According to the principle of the 5W1H, an event can be considered as completely described if the following six questions starting with an interrogative word have been answered:

Who was involved?
What happened?
Where did it take place?
When did it take place?
Why did it happen?
How did it happen?

The answers to these questions describe an event and distinguish the event from other events.

2.1.2 Controversy Elements

According to Webster's dictionary, a controversy is a discussion marked especially by the expression of opposing views. A controversial event can be detected as dissenting opinions in social media, usually associated with negative sentiments, from public users to the entity. In certain embodiments, the more people (and/or the more influential people) that express their dissenting opinions, the more controversial an event is.

2.2. Topics for Controversial Events

Controversial events could fall into a range of topics such as operational, governance, social, environmental, or legal events which may, in some embodiments, be defined as follows:

An operational controversy can be about manufacturing processes and production systems, inventory management, product and service quality, and service operations. An entity often seeks to administer a high level of operational efficiency to improve profitability without compromising on the quality of the final product or service.

A governance controversy is about board effectiveness, ownership structure, management culture, regulatory, tax, or legal events, internal controls, consistency of messaging, and financial reporting and transparency. Governance events also relate to management operational effectiveness and expertise, and risk management.

A social controversy can be about the entity management of human capital, impact on society and communities, engagement with customers, regulators, industry groups, and policymakers, and maintenance of its social license to operate. Over the last few years, the primary type of event in this category is related to technology, data security and privacy. Social controversies include topics such as hacks into the entity information system, data ownership, privacy, and security.

An environmental controversy can be about greenhouse gas (GHG) emissions, energy use including renewable energy, biodiversity, climate change impacts, manufacturing procedures/processes, pollution, waste management, and water use and decontamination.

A legal or regulatory controversy can be about a failure of an entity in complying with requirement imposed on the industry in which the entity operates. Such an event can create liability issues for the entity.

There could be instances when a controversy overlaps across topics such as the Volkswagen emissions controversy in September 2015. Such a controversy could be classified as an operational, environmental, and governance controversy.

3. Controversy Impact

3.1. Controversy Impact Scope

The system can detect controversial events at a number of levels, including but not limited to at a local, national and/or global level.

3.1.1. A Local Impact Controversy

A local impact controversy is typically a small controversy of limited geographical scope. These controversies may have very limited to no financial impact on the entity. However, they are still important to detect and measure because they could be early warning signs of a national or global controversy or signal a lack of framework to address the problem within the entity.

A entity may address these local controversies to mitigate future risk of an event of a similar nature by performing one or more actions including initiating a change in policy, implementing a mitigation plan, or conducting entity-wide employee trainings.

3.1.2. A National Impact Controversy

A national impact controversy has a moderate scale and impact to the entity. These controversies could have limited to significant financial impact on the entity. The entity may be operating on a national scale or global scale but the controversy can be confined to a specific country or region.

In particular, the financial performance within a specific region could be impacted while the rest of the operations remain unaffected. However, when the financials are consolidated, the overall financial metrics of the entity can reflect a significant decline as well.

3.1.3. A Global Impact Controversy

A global impact controversy is a controversy with widespread effect on the entity and if the market share of the entity in a given industry or sector is relatively meaningful, the controversy could impact an industry sector across multiple countries. The entity may be operating on a global scale, have suppliers or customers across the globe, and have a significant amount of market share in the industry in which it operates.

These controversies could result in meaningful financial impact to the entity and in rare cases, could bankrupt the operating entity. There is the potential for significant damage to multiple parties as a result of this type of event if, for example, the entity is a supplier to a widely distributed end product.

3.2. Performance Impact

Performance can be considered the change in market performance of the entity which consists of price volatility of the publicly or privately traded financial instruments or volatility in trading volume of the financial instruments.

3.2.1 Impact on Market Volatility

Market performance can be considered the change in price of publicly traded equity and bond instruments in the marketplace.

The price changes can be measured at the opening, closing, or at the high, or low price for a given trading day.

3.2.2 Impact on Trading Volume

The level of trading volume is also useful because it can signal a high level of market reaction to an event, indicating the existence of a controversial event, even when there isn't an overall price change due to equal positive and negative reactions.

4. System Architecture

Figure 2:
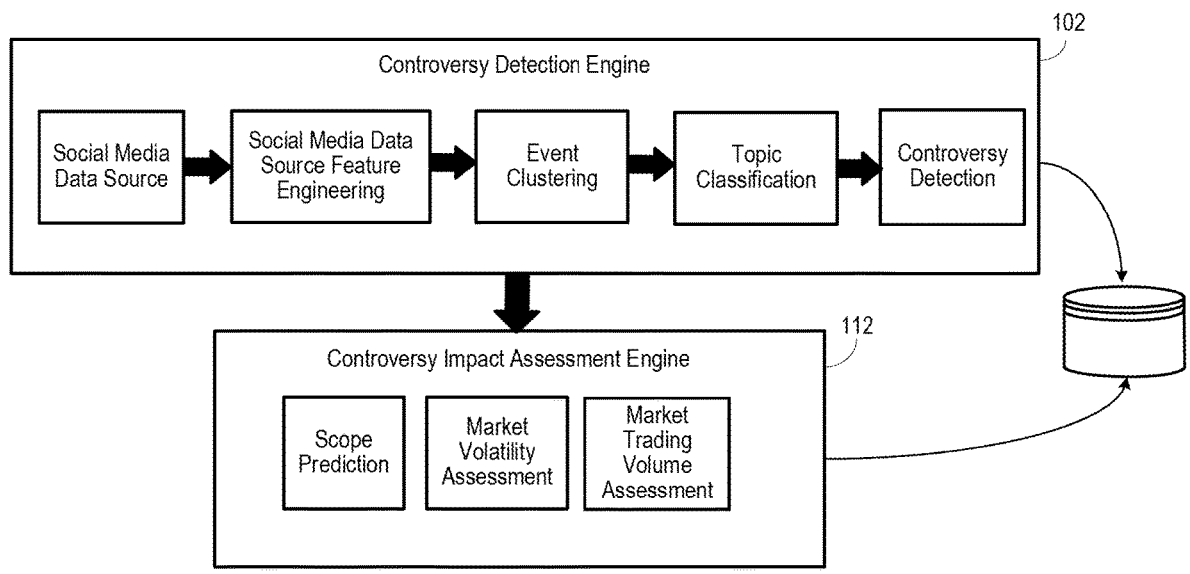
FIG. 2 provides more details of the controversy detection and impact assessment and prediction system of FIG. 1.

Systems described in this specification can take the form of a scalable system to detect controversial events, assess their impacts, and predict a controversy's future impacts including market volatility and trading volume fluctuations in a timely manner. FIG. 1 shows an example controversy detection and impact assessment and prediction system 100. FIG. 2 provides more details of the example controversy detection and impact assessment and prediction system of FIG. 1.

With reference to FIGS. 1 and 2, the system can have three main components: a controversy detection engine 102, a controversy impact assessment engine 112, and a controversy impact prediction engine 120.

The controversy detection engine 102 ingests one or more social media data sources 104 (e.g., social media or micro blog data) at scale and detects emerging controversial events. The controversy detection engine 102 includes: a feature engineering engine 105 that performs feature engineering on the social media data from source 104; an event clustering engine 106 that performs event clustering using features of the social media data and places postings into clusters; a topic classification engine 107 that classifies a controversy into a topic; and a controversy detection engine 108 that detects a controversy based on the event clustering data. In an embodiment, the event clustering engine 105 can include a 5W1H engine that can extract at least some 5W1H information about a posting.

The impact assessment engine 112 assesses the impact of a controversy using a scope assessment engine 114; a market volatility prediction engine 116 that predicts the percentage of the stock or bond price changes in the future; and a market trading volume assessment engine 118 that predicts the percentage change in future trading volume. Furthermore, the controversy detection engine 102 and the impact assessment engine 112 can operate in parallel. The controversy detection engine 102 can produce data that can be stored in a database 128. Assessing the impact of the controversy can be based at least in part on a knowledge base of controversial events and their impacts, which can be stored in the database 128. The controversy impact assessment engine can also draw from the controversy detection engine 102 as well as from the data stored in the database.

With reference to FIG. 1, the controversy impact prediction engine 120 predicts the impact of a controversial event on an entity to which the system has determined the event relates. The controversy impact prediction engine 120 includes: a scope prediction engine 122 that predicts the scope of a controversy and performs a multi-level classification (e.g., local, national or global scope); a market volatility prediction engine 124 that predicts the percentage of the stock or bond price changes in the future; and a trading volume prediction engine 126 that predicts the percentage change in future trading volume. The controversy impact prediction engine 120 draws from the controversy detection engine 102, the controversy impact assessment engine 112, and the data stored in the database 128. Assessing the impact of the controversy can be based at least in part on a knowledge base of controversial events and their impacts, which can be stored in the database 128. FIG. 2 shows one embodiment of the flow of data between the components of the controversy detection engine 102 and between the controversy detection engine 102 and the impact assessment engine 112.

4. Methodology

4.1. Controversy Detection

4.1.1 Social Media Data Source

The system can use real-time social media data, e.g., a streaming application programming interface (an API) to collect data for a given entity. For example, Twitter's filtered streaming API delivers 1% (about 6+ million tweets per day) of all Twitter data every day.

The system can use a parameter for this filtered streaming API that allows the system to define a comma-separated list of phrases which the API uses to determine which Tweets will be delivered on the stream. For example, an API setting that tracks tweets of a given entity (or set of companies) may look like the following:

"https://stream.twitter.com/1.1/statuses/filter.json?track=facebook,cisco,walmart, . . . "

Once the system receives data from such an API, it then separates postings associated with each entity and runs the downstream process on separated data streams individually.

4.1.2. Feature Engineering

The controversy detection system collects postings for a given entity (e.g., company). For each incoming posting, the system can store the following attributes: posting id, creation_time, text, language, source, urls, and hashtags.

In one embodiment, the system parses a text attribute of each posting and computes and records the sentiment of a posting as either negative, positive, or neutral. The system establishes a baseline sentiment measure for the entity to detect the deviations in sentiment on a given entity (e.g., company). Other measures such as inflection points on sentiment can be used to measure the duration of impact of a controversial event on the entity.

The system can extract various part-of-speech (POS) tags of each posting's text and then store the resulting terms. The system can detect phrases and patterns among the terms. If similar terms are extracted across multiple postings, then the system can consider the similar terms as elements of an event. In addition, the system can use a named entity recognition (NER) process to extract entities such as person names, organizations, time, locations and quantities from postings. The terms from POS tagging largely represent what and why information, while NER can help to detect where, when and who information. The outputs of the POS and NER processes capture the majority of the 5W1H elements of an event.

In one embodiment, the system crawls the URLs in a posting and verifies whether the link comes from one or more credible news sources. For example, the system may consider the following to be examples of a credible news source: 1) a news outlet that has, and consistently applies, journalistic standards in its reporting or 2) an authoritative government agency not acting in a political capacity. Determining whether a source is a credible news source can depend on the context of the event and can change over time.

Based on all the extracted features the system can build a posting vector. A posting vector can include the following features: posting id, creation time, source, hashtags, proper nouns, sentiment, news link, who, what, where, when, how, and why (the 5W1H described above).

4.1.3. Event Clustering

When a new posting is published it either forms a new cluster or it will be added to an existing cluster. A new tweet will be added to an existing cluster if it is sufficiently similar to one of the existing clusters based on the cosine distance between the vector of the posting and a cluster average posting vector. If more than one cluster is applicable, the system selects the cluster that has the highest similarity with the new posing. If a new posting was not added to any of the existing clusters, the new posting is used to form a new cluster. In one embodiment, a potential event is a cluster that has at least five postings.

4.1.4 Controversy Detection

An event can be controversial if the public expresses dissenting opinions, usually associated with negative sentiments, about the event. The system can use the following metrics to filter out irrelevant events and noise from controversial events:

The burstiness of an event: To detect the burstiness of an event, the system detects the volume of tweets per time period, e.g., per hour, for the entity in question. In one embodiment, an event is flagged when the size of the event's cluster is greater than an adaptive threshold that is defined with respect to a periodic, e.g., an hourly, volume of tweets. An anomaly detection process can detect an abnormal surge of tweets, which can be a signal for a controversial event.

Newsworthiness detection: The system can count the total number of unique verified news links in each cluster and log that count as a newsworthiness metric.

Sentiment: For each cluster the system can obtain its overall sentiment by counting the number of tweets that have negative, positive, and neutral sentiment.

Credibility: The system can determine the users who are at the root of each posting. The system can check whether a posting is from a 'verified' user. The system can also evaluate the impact of those who are propagating the posting. For example, the system can determine the number of followers of the source of the posting and/or of those that reposted.

The system can rank events based on these metrics. The system can select the events with a high ranking (e.g., events that are have a metric indicating a high burstiness attribute, are newsworthy, have a negative sentiment and high credibility) to be controversial events.

The system can detect a controversy impacting an entity within a short time, e.g., within two hours, of the occurrence of the controversial event.

The system can also compute a summary of each controversial event. An event summary can be a set of postings that shows what the controversy is about. To compute the summary, the system can first compute an event centroid. The event centroid is the mean value of all the posting vectors in a cluster. The system uses tweet term frequency-inverse document frequency (tf-idf) score to weight the posting's terms.

For postings within the cluster, the system computes the similarity of the posting with the cluster centroid. The top three unique postings with the highest similarity value can be selected as a cluster summary.

4.1.5 Controversy Topic Classification

A controversy classification engine identifies the topic of a detected controversial event. The system can use a topic classification model to categorize a controversial event to various topics such as social, operational, and legal.

The system can leverage labeled data to build a classifier. The system can assemble training data from historical controversial events described in textual format and labelled by analysts. To enrich the training data, the system can use news articles related to relevant controversial events. As for non-controversial training samples, the system can sample postings of the same entities that are posted out of the periods of known events and the system can sample news articles as well. The system can confirm that the news articles are not related to relevant controversial events. To ensure the credibility of news sources used in this process, the system can restrict the news sources to major news agencies, such as Washington Post, CNN, and Reuters.

The system can classify postings in the event cluster and the title of the news mentioned in the postings as well. The final category of the whole event cluster can be determined by the majority classification among the cluster.

4.2 Controversy Impact Assessment

4.2.1. Controversy Scope Estimation

The system identifies the scope of a controversy to be either local, national or global. The system uses two metrics to measure the scope of an event. A first metric is a visibility score which considers the potential geographic scope of a detected controversy cluster. For all the postings inside the cluster, the system determines the people who posted them and counts the number of their followers outside of the cluster. Since all the followers may not necessarily see the postings of the people they follow, the system multiplies the total count by a visibility threshold (\theta).

A second metric is a broadcast score which considers the type of news media that covers the event. One embodiment of the system groups the news media into three categories: local news channels (e.g., New York Daily News and Spectrum News NY1), national news channels (e.g., CBS and New York Times) and global news channels (e.g., BBC, CNN, and Reuters). The system counts the number of local news links, national news links, and global news links at each event cluster and normalize the distribution.

The event scope estimation score can be a combination of visibility score and broadcast score.

4.2.2 Controversy Impact on Market Performance

The system can use a daily stock price or bond price information source e.g., Bloomberg API, to obtain daily stock and bond price data. The system can collect opening price, closing price, daily high, and daily low prices for each entity (e.g., publicly traded company) of interest per trading day. The system can also collect trading volume of each publicly traded company stock of interest. The system can obtain historical data over a period time, e.g., over years. With regards to real-time data for a specific day, the system can obtain real-time updates and determine the daily low and daily high prices upon close of the trading day.

A controversial event can impact the market performance of the entity which can in turn impact the entity's stock or bond price and a trading volume fluctuation. The market reaction to a controversy is usually prompt and there is a relatively small lag between a controversy and market reaction. The system can analyze a materiality connection between an event and the entity's stock or bond price and trading volume movement through a two-step test. One embodiment of such a two-step test is as follows.

1. Test the hypothesis of normal stock or bond price and volume fluctuation.
   a. Given a controversial event detected at day t, remove the market performance impact from any previous controversial events of the entity that occurred in the past 1 year, i.e. t−365.
   b. For each event detected at day t, connect it with the strongest stock or bond fluctuation within day t and up to t+7 days as the short-term impact and up to t+365 days as the long-term impact.
   c. Build a distribution of associated stock fluctuation of non-controversial events.
   d. When a controversial event occurs, compute the p-value of associated stock or bond fluctuation falls in the distribution of non-controversial events.
   e. If the p-value is less than 0.05, this hypothesis testing fails and the system can conclude the stock or bond movement is abnormal. Then, the next step is to eliminate the possibility this stock or bond movement is actually due to overall stock or bond market fluctuations.

2. Eliminate the Possibility of Market Volatility.
   a. Given a controversial event detected at day t, compute the daily stock or bond movement of the target entity and its distribution in the past 1 year, i.e. t−365. If the stock or bond movement between day t and t+7 in the short-term and day t and t+365 in the long-term is not an outlier (i.e. p-value>0.05) against stock or bond movement between t−365 and t. Then the movement is within the normal stock or bond volatility and connection cannot be established.
   b. Compute the daily stock or bond movement of all listed companies (can use indexes like S&P 500 as proxies) and its distribution between day t and t+7 for the short-term and day t and t+365 in the long-term. If the index movement is also abnormal and in the same direction with the entity's stock or bond movement. In this case, the system cannot establish the connection since the entity's stock movement may be caused by the market itself, not the event.

4.2.3 Controversy Impact Knowledge Base

The detected controversial events as well as their impact scope and market performance impact data collected by the system accumulate valuable knowledge about the impact of a historical corporate controversy. These pieces of information are stored in a database as the knowledge base of the impact of a controversy. The data collected can include:

Event information: event cluster size, event location, event time, event posting vectors, associated entity, entity type, entity geographic footprint Controversy information: controversial topics, (positive, negative and neutral) sentiment distributions Impact information
   Impact scope including reported news media type (local, national or global) and number of followers of discussion participants
   Market performance impact including stock or bond price fluctuations and trading volumes for day t and t+7 in the short-term and day t and t+365 in the long-term.

This data can be used by the controversy impact prediction engine to estimate the impact of future controversial events.

4.3 Controversy Impact Prediction

With the stored knowledge of past controversial events and their impact outcomes, this system can first estimate the impact of events considering their scope and then estimate the impact of a corporate controversial event on the state of the entity, e.g., the financial and/or operating state of the entity. The prediction engine can build regression and classification models for predicting impact scope and market performance impact using training data stored in the knowledge base. The training data is compiled as follows.

Features:

Given a collection of historical controversial events, a feature vector of an event may consider but is not limited to: (1) event information, including event cluster size, event location, event time, event posting vectors, associated entity, entity type, entity geographic footprint; and (2) controversy information, including controversial topics, (positive, negative and neutral) sentiment distributions.

Ground Truths:

For impact scope prediction, a ground truth is the impact scope obtained from the impact assessment engine of the system. For market performance impact prediction, a ground truth is market volatility and trading volume data from the impact assessment engine.

Machine learning models can be created using training data features and ground truths. When a new controversial event is detected in the future, the system can convert this event into the aforementioned features, fit them with machine learning models and then generate an estimated impacts as follows.

4.3.1 Scope Prediction

The system can build a multi-level classification model (e.g., a model that classifies according to local, national and global scope) and predict the scope of a controversy.

4.3.2. Market Volatility Prediction

The system can predict market volatility for a particular entity associated with a controversial event by predicting the percentage of the stock price changes, and can utilize regression models to do so.

4.3.3. Trading Volume Prediction

The system can predict trading volume by predicting the percentage change in the trading volume using regression models.

5. Application

Figure 3:
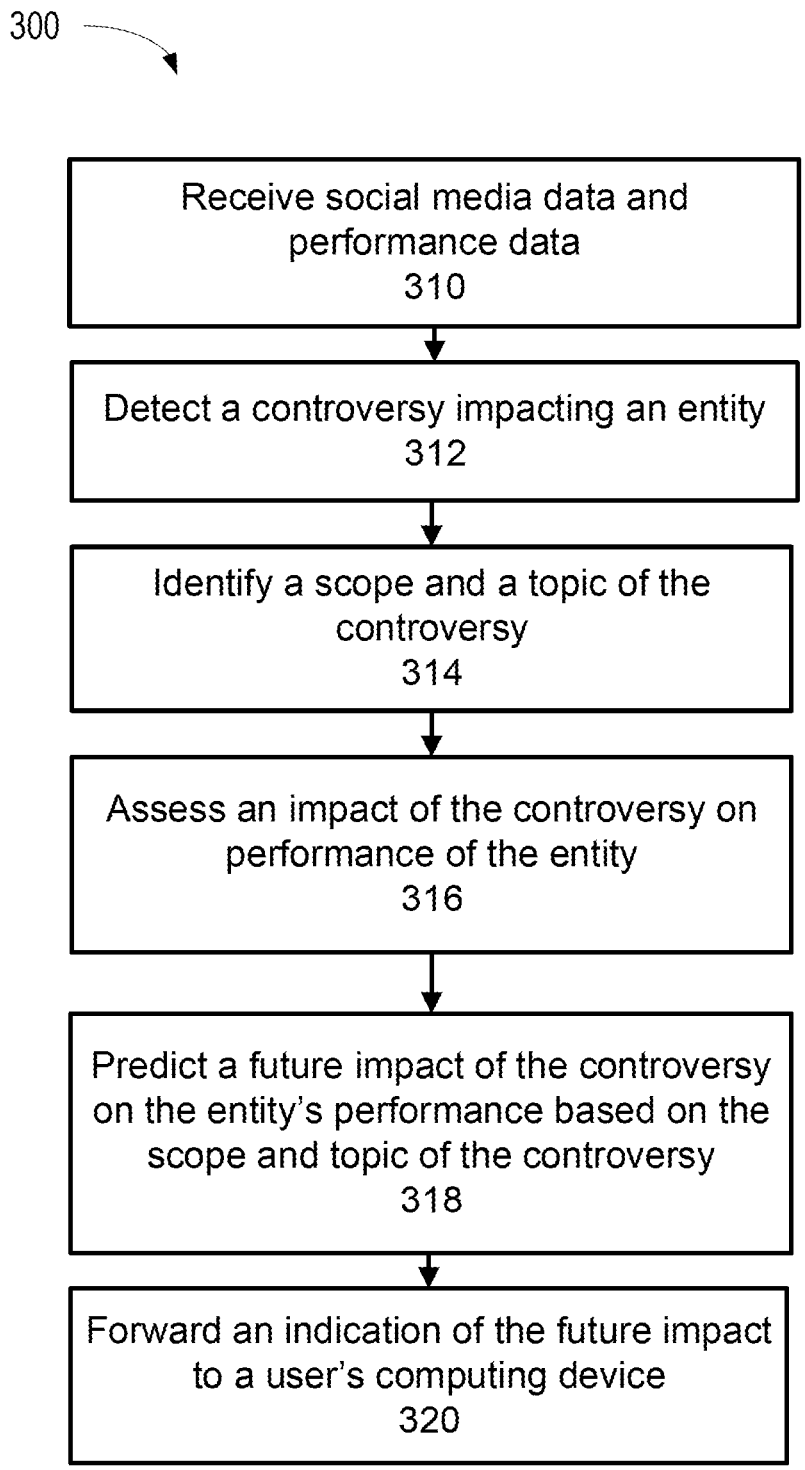
FIG. 3 is a flow chart showing one example of a controversy detection, impact assessment, and impact prediction method.

FIG. 3 is a flowchart of an example process 300 for detecting a controversy, assessing its current impact and predicting its future impact. For convenience, the process 200 will be described as being performed by a system of one or more computers, located in one or more locations, and programmed appropriately in accordance with this specification. For example, a controversy detection, assessment and prediction system, e.g., the controversy detection, assessment and prediction system 100 of FIG. 1, appropriately programmed, can perform the process 300.

With reference to FIG. 3, one innovative aspect of the subject matter described in this specification can be embodied in methods that include the actions of: receiving 310 social media data and performance data; detecting 312, based at least in part on the social media data, a controversy impacting an entity; identifying 314 a scope and a topic of the controversy; assessing 316 an impact of the controversy on performance of the entity based at least in part on the performance data; predicting 318 a future impact of the controversy on the entity's performance based at least in part on the scope and topic of the controversy; and forwarding 320, for display to a user, an indication of the future impact to a user's computing device.

Figure 4:
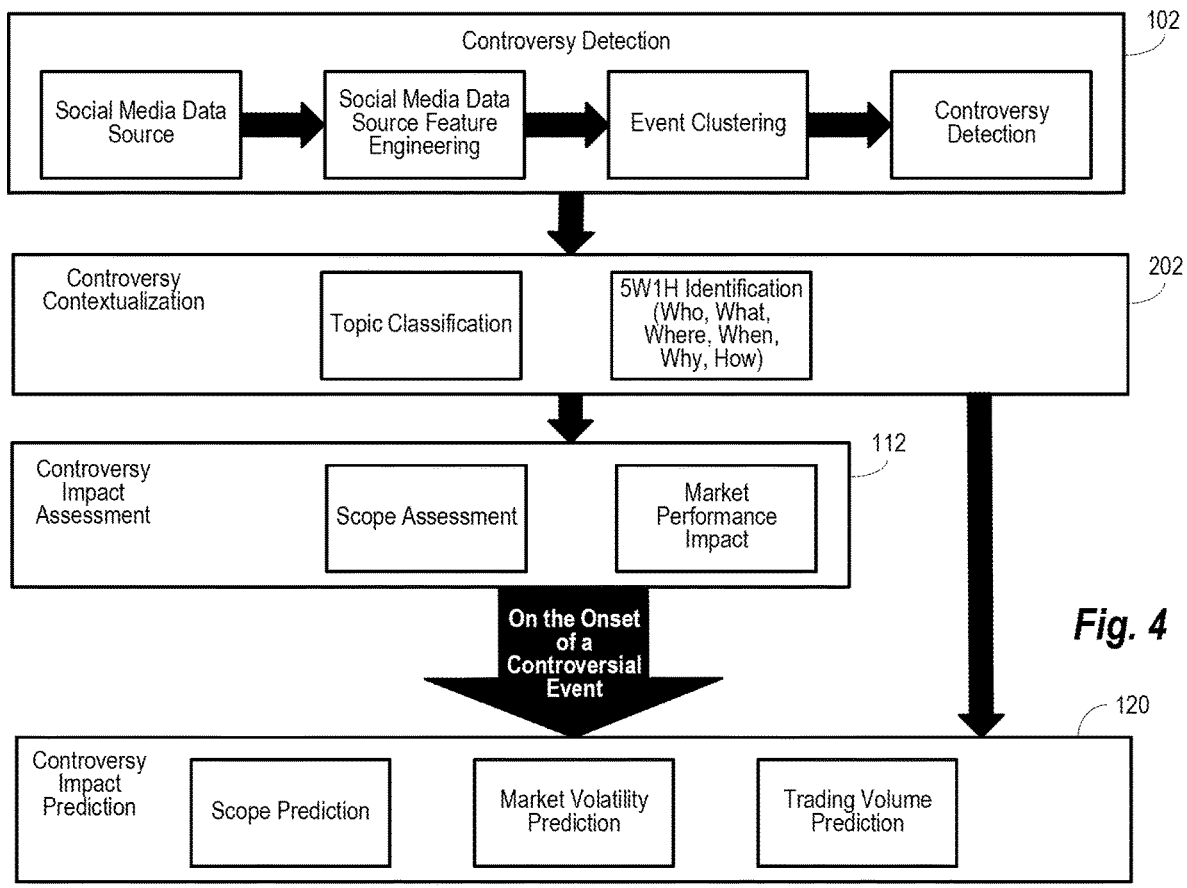
FIG. 4 is another example of a controversy detection and impact assessment and prediction system similar to the system of FIG. 1.

FIG. 4 is another example of a controversy detection and impact assessment and prediction system similar to the system of FIG. 1. The system can include a controversy detection engine 102; a controversy contextualization engine 202; a controversy impact assessment engine 112; and a controversy impact prediction engine 120. The controversy detection engine includes: a social media data source; a feature engineering engine; an event clustering engine; and a controversy detection engine. The controversy contextualization engine 202 includes a topic classification engine and a 5W1H engine. In an embodiment, the topic classification engine can include the 5W1H engine as a subset of the topic classification engine. The controversy impact assessment engine 112 can include a scope assessment engine and a market performance impact engine. On the onset of a controversial event, the system can perform a controversy impact prediction using the controversial impact prediction engine 120, which includes a scope prediction engine; a market volatility prediction engine; and a trading volume prediction engine.

Figure 5:
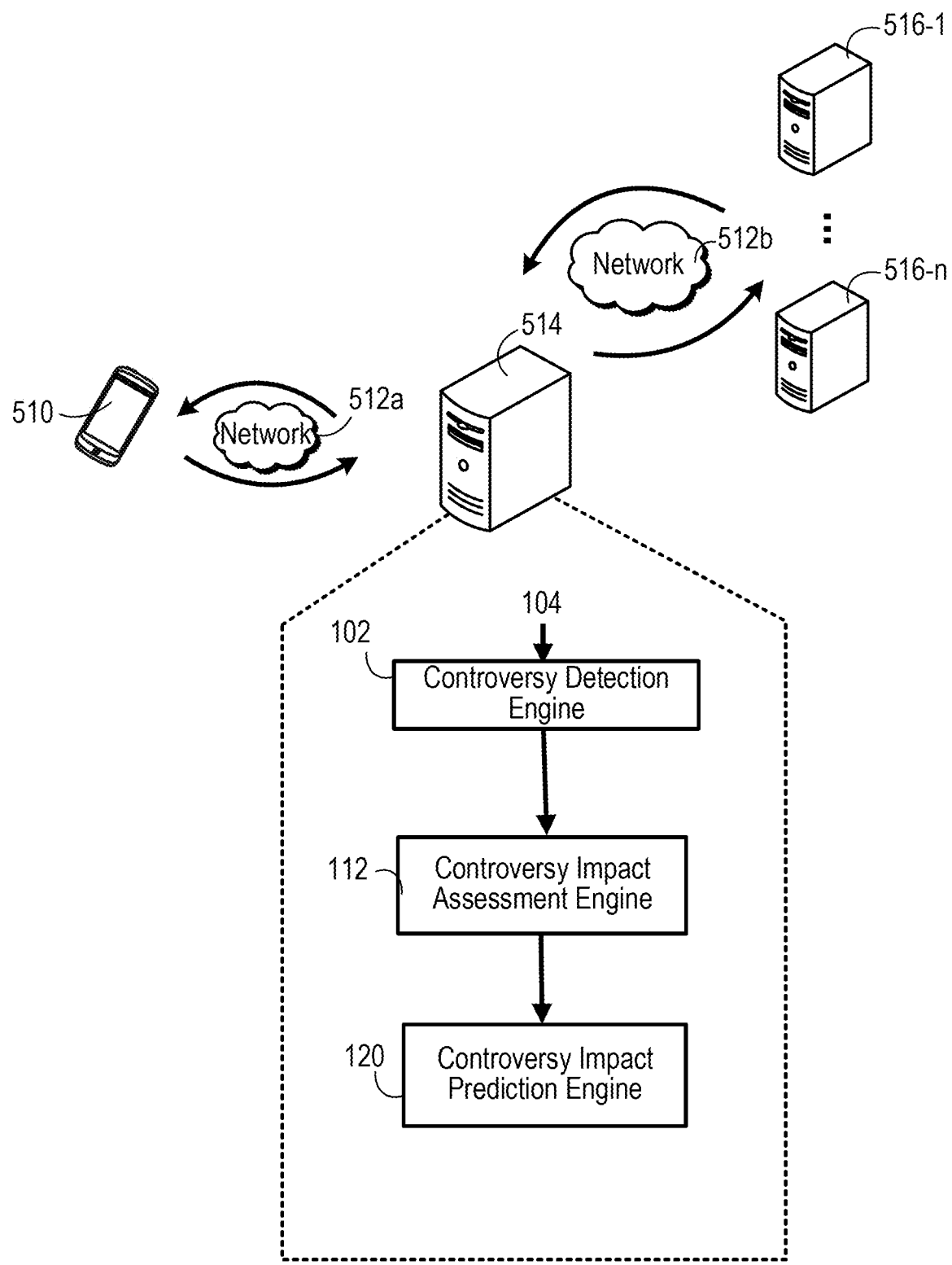
FIG. 5 is a schematic illustration of a broader environment of a controversy detection, impact assessment, and impact prediction system.

With reference to FIG. 5, the systems shown in FIGS. 1 and 2 are used in a broader environment. For example, the system of FIG. 1 can reside on a server 514 that communicates with a user computing device 510 via network 512a and with other servers 516-1 to 516-n via network 512b.

Figure 6:
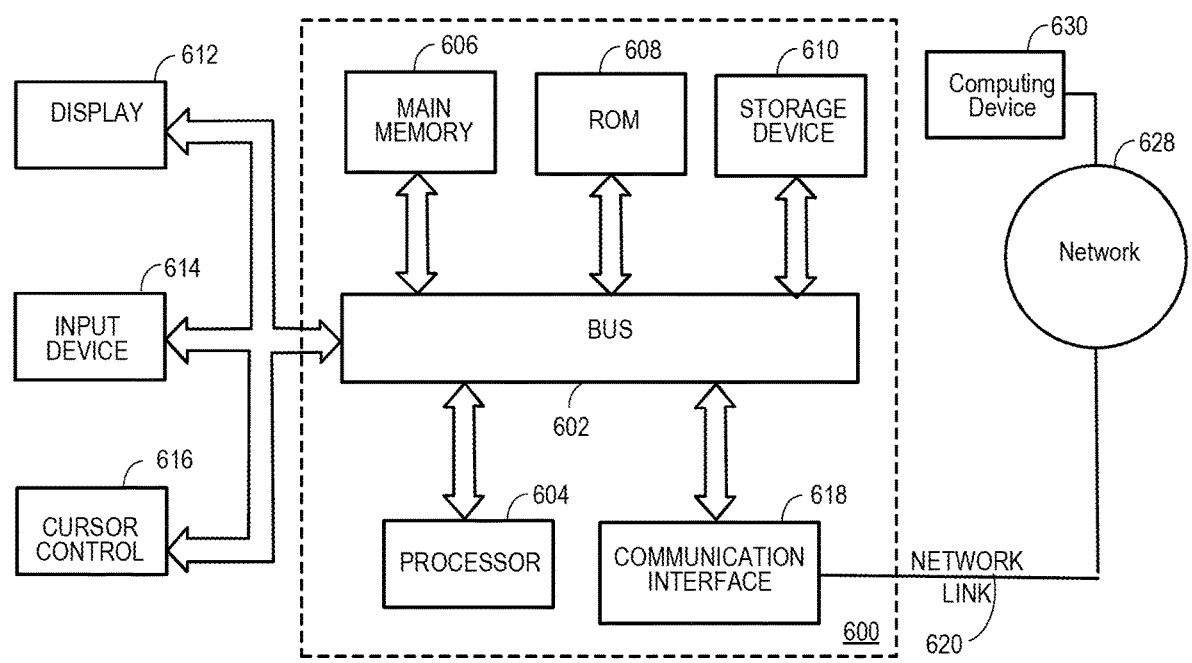
FIG. 6 is a schematic illustration of an example computer system upon which an embodiment described in this specification can be implemented.

FIG. 6 is a schematic illustration of an example computer system upon which an embodiment described in this specification can be implemented. For example, The system of FIG. 1 can reside on a system 600 having a processor 604 that communicates via with a main memory 606, a ROM 608, a storage device 610, a communication interface 618, input device 614, display 612, and cursor controls 616. The communication interface 618 can connected to a network 628 which can in turn be connected with another computing device 630.

The systems described in this specification can be used to automatically detect, analyze, and measure the impact of controversial events on the market performance of the entity.

The systems provide a systematic way to identify the impact of controversies on the entity. Utilizing real-time social media data, e.g., Twitter streaming data, given the entity, the systems detect and categorize controversial events. The systems can predict the impact of these controversial events at the onset of the event break-out.

This corporate event risk detection and prediction technology systematically informs companies or investors about the potential future effect and the cost of controversial event on the operations of the entity and thus allows companies to be accountable and for the entity's management or investor(s) to respond appropriately.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In this specification, the term "database" will be used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
receiving real-time microblog post data for microblog posts from at least one social media data source and performance data from at least one data server
using an event clustering engine to determine cluster data for the microblog posts, the event clustering engine configured to add a microblog post to an existing cluster if the microblog post's similarity to a cluster average posting vector exceeds a threshold and to create a new cluster if the microblog post's similarity to an existing cluster does not exceed the threshold;
detecting, using a controversy detection engine and based at least in part on the real-time microblog post data and the cluster data, a controversy impacting an entity, wherein the controversy detection engine comprises a microblog post feature engine configured to 1) determine features of a microblog post, the features comprising proper nouns contained in the microblog post, a sentiment of the microblog post, and a news link contained in the microblog post, and 2) build a microblog post vector using the features of the microblog post;
identifying, using a topic classifier, a topic of the controversy, the topic classifier trained using historical controversial events and historical non-controversial events;
assessing, using a controversy impact assessment engine, a current impact of the controversy on performance of the entity based at least in part on the performance data, the controversy impact assessment engine comprising: i) a scope assessment engine configured to determine the scope of a controversy as local, national or global; ii) a market volatility assessment engine configured to determine the volatility of a value of equity of interest in the entity; and iii) a market trading volume assessment engine configured to determine a trading volume for equity of interest in the entity;
predicting, using a controversy impact prediction engine, a future impact of the controversy on the entity's performance based at least in part on the scope and the topic of the controversy, the controversy impact prediction engine comprising: i) a scope prediction engine configured to predict the scope of a controversy as local, national or global; ii) a market volatility prediction engine configured to predict the volatility of a value of equity of interest in the entity; and a market trading volume prediction engine configures to predict a trading volume for equity of interest in the entity;
forwarding to a user's computing device, for display to a user, the assessment of the current impact of the controversy on performance of the entity and the prediction of the future impact of the controversy on the entity's performance; and
taking action to protect assets based on at least one of the assessment and the prediction.

2. The method of claim 1, wherein detecting a controversy impacting an entity comprises detecting a controversial event impacting an entity based on social media data and within two hours of the occurrence of the controversial event.

3. The method of claim 1, wherein the scope of the controversy is categorized as at least one of a local impact controversy, a national impact controversy, and a global impact controversy.

4. The method of claim 1, wherein the topic of the controversy is classified as at least one of an operational controversy, an environmental controversy, a social controversy, a governance controversy, or a legal controversy.

5. The method of claim 1, wherein detecting a controversy impacting an entity comprises: 1) determining that the volume of microblog posts describing an event per specified time period exceeds a threshold; 2) determining the total number of unique verified news links in each cluster; and 3) determining the overall sentiment of a cluster by counting the number of microblog posts in the cluster that have negative, positive and neutral sentiment.

6. The method of claim 1 wherein the social media data is microblog data and wherein detecting a controversy comprises detecting a controversial event based at least in part on the microblog data including determining at least one entity mentioned in a microblog entry, and at least one of where, when, how and why the controversial event occurred.

7. The method of claim 1, wherein detecting a controversy comprises determining the volume of microblog entries referencing a controversial event per predetermined time period and detecting a sentiment of at least some of the microblog entries.

8. The method of claim 7, wherein determining the volume of microblog entries referencing a controversial event per predetermined time period comprises determining the volume of microblog entries referencing a controversial event per hour.

9. The method of claim 7, wherein detecting a controversy further comprises:
determining a cluster of microblog entries and wherein the microblog is a member the cluster if it shares characteristics with the cluster;
determining the number of news links in each cluster; and
determining the source of at least one microblog entry in the cluster.

10. The method of claim 1, wherein the controversy comprises a controversial event and wherein assessing the impact of the controversy further comprises:
determining a broadcast score for a controversial event based at least in part on the type of news media that are mentioned in microblog entries that refer to the controversial event.

11. The method of claim 1, wherein assessing the impact of the controversy further comprises:
assessing the impact of the controversy based at least in part on a knowledge base of controversial events and their impacts.

12. The method of claim 1, wherein the controversy comprises a controversial event and wherein predicting the future impact of the controversy on the entity's performance comprises:

determining a characteristics for a controversial event including event information and controversy information; and utilizing a machine learning model to predict, based at least in part on the characteristics and on prior impact assessments for controversial events having similar features, the future impact of the controversial event on an entity's performance.

13. The method of claim 1, wherein the controversy comprises a controversial event and wherein predicting a future impact of the controversy on the entity's performance based at least in part on the scope and the topic of the controversy comprises predicting a future impact of the controversy on the entity's performance based on at least one of who, what, when, where and how of the controversial event.

14. A system comprising:
one or more computers and one or more storage devices on which are stored instructions that are operable, when executed by the one or more computers, to cause the one or more computers to perform operations comprising:
receiving real-time microblog post data for microblog posts from at least one social media data source and performance data from at least one data server;
using an event clustering engine to determine cluster data for the microblog posts, the event clustering engine configured to add a microblog post to an existing cluster if the microblog post's similarity to a cluster average posting vector exceeds a threshold and to create a new cluster if the microblog post's similarity to an existing cluster does not exceed the threshold;
detecting, using a controversy detection engine and based at least in part on the microblog post data, a controversy impacting an entity, wherein the controversy detection engine comprises a microblog post feature engine;
configured to 1) determine features of a microblog post, the features comprising proper nouns contained in the microblog post, a sentiment of the microblog post, and a news link contained in the microblog post, and 2) build a microblog post vector using the features of the microblog post;
identifying, using a topic classifier, a topic of the controversy, the topic classifier trained using historical controversial events and historical non-controversial events;
assessing, using a controversy impact assessment engine, a current impact of the controversy on performance of the entity based at least in part on the performance data, the controversy impact assessment engine comprising: i) a scope assessment engine configured to determine the scope of a controversy as local, national or global; ii) a market volatility assessment engine configured to determine the volatility of a value of equity of interest in the entity; and iii) a market trading volume assessment engine configured to determine a trading volume for equity of interest in the entity;
predicting, using a controversy impact prediction engine, a future impact of the controversy on the entity's performance based at least in part on the scope and the topic of the controversy, the controversy impact prediction engine comprising: i) a scope prediction engine configured to predict the scope of a controversy as local, national or global; ii)
a market volatility prediction engine configured to predict the volatility of a value of equity of interest in the entity; and a market trading volume prediction engine configures to predict a trading volume for equity of interest in the entity; forwarding to a user's computing device, for display to a user, the assessment of the current impact of the controversy on performance of the entity and the prediction of the future impact of the controversy on the entity's performance; and
taking action to protect assets based on at least one of the assessment and the prediction.

15. The system of claim 14, wherein detecting a controversy further comprises:
determining a cluster of microblog entries and wherein a microblog is a member a cluster if it shares characteristics with the cluster;
determining the number of news links in each cluster; and
determining the source of at least one microblog entry in the cluster.

16. The system of claim 14, wherein detecting a controversy impacting an entity comprises detecting a controversial event impacting an entity based on social media data and within two hours of the occurrence of the controversial event.

17. The system of claim 14, wherein assessing the impact of the controversy further comprises:
assessing the impact of the controversy based at least in part on a knowledge base of controversial events and their impacts.

18. A method comprising:
receiving real-time microblog post data for microblog posts from at least one social media data source;
using an event clustering engine to determine cluster data for the microblog posts, the event clustering engine configured to add a microblog post to an existing cluster if the microblog post's similarity to a cluster average posting vector exceeds a threshold and to create a new cluster if the microblog post's similarity to an existing cluster does not exceed the threshold;
detecting, using a controversy detection engine and based at least in part on the microblog post data, a controversy impacting an entity, wherein the controversy detection engine comprises a microblog post feature engine configured to: 1) determine features of a microblog post, the features comprising proper nouns contained in the microblog post, a sentiment of the microblog post, and a news link contained in the microblog post, and 2) build a microblog post vector using the features of the microblog post;
identifying, using a topic classifier, a topic of the controversy, the topic classifier trained using historical controversial events and historical non-controversial events;
predicting, using a controversy impact prediction engine, a future impact of the controversy on the entity's performance based at least in part on the topic of the controversy, the controversy impact prediction engine comprising: i) a scope prediction engine configured to predict the scope of a controversy as local, national or global; ii) a market volatility prediction engine configured to predict the volatility of a value of equity of interest in the entity; and a market trading volume prediction engine configures to predict a trading volume for equity of interest in the entity;

forwarding to a user's computing device, for display to a user, the prediction of the future impact of the controversy on the entity's performance; and taking action to protect assets based on at least in part on the prediction.

19. The method of claim 18, wherein the scope of the controversy is categorized as at least one of a local impact controversy, a national impact controversy, and a global impact controversy.

20. The method of claim 18, Wherein the topic of the controversy is categorized as an operational controversy, an environmental controversy, a social controversy, a governance controversy, or a legal controversy.

21. The method of claim 18, wherein detecting a controversy further comprises:

determining a cluster of microblog entries and wherein a microblog is a member a cluster if it shares characteristics with the cluster;

determining the number of news links in each cluster; and determining the source of at least one microblog entry in the cluster.

* * * * *